June 24, 1930.   C. H. KUNSMAN   1,767,218
POSITIVE ION EMITTER
Filed Sept. 28, 1925
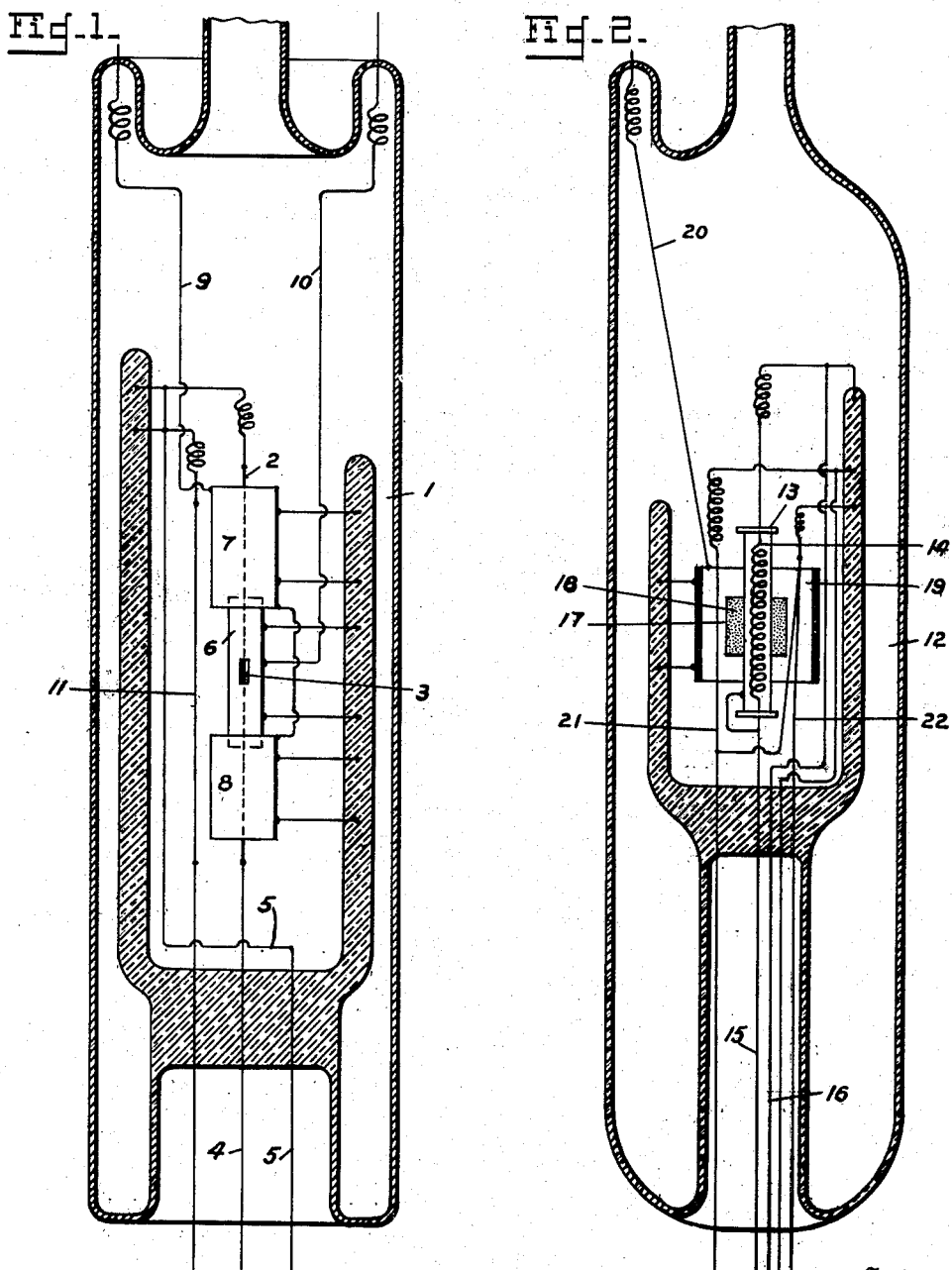
Inventor
C. H. Kunsman
By W. N. Roach
Attorney Patented June 24, 1930

1,767,218

UNITED STATES PATENT OFFICE

CHARLES H. KUNSMAN, OF STONE CHURCH, PENNSYLVANIA, ASSIGNOR TO ARTHUR B. LAMB, TRUSTEE

POSITIVE-ION EMITTER

Application filed September 28, 1925. Serial No. 59,212.

This invention relates to positive ion emitter and, more specifically, to compositions of matter and the methods of preparing and treating the same and to the use of the resultant materials as sources of ionic emission.

At the present time, as is well known to those familiar with this art, definite sources of negative thermions or thermionic electron emission are known, but no definite or constant or easily controlled source of positive thermions has heretofore been discovered. A definite constant and easily controllable source of positive thermions is highly desirable in many electrical, thermionic, and chemical devices, as for instance, in vacuum tubes and in synthetic chemistry.

The present invention is designed to provide such definite, constant easily controllable sources of positive thermionic emission.

For this purpose, compositions of matter are formed and are used as definite sources of known positive ions; the rate of evaporation of these positive ions is controlled by varying the temperature, varying the mixture of the ingredients, and by varying the previous gas and heat treatment of the mixture or by using the materials in the presence of selected gases.

These mixtures consist, essentially of certain elements which act as a base, being capable of permitting the escape of ions from an ion emitting substance while retaining the residue of such substance as for instance, copper, iron, nickel, cobalt, magnesium, manganese, etc., or alloys of such metals combined with other substances capable of emitting ions, and preferably with a substance which exerts a control of the emission of ions, specifically a refractory oxide. Refractory oxide makes the mixture more stable and is hence desirable though not essential.

Some specific example of such mixtures are the following:

1. Iron or an equivalent base and an alkali oxide.
2. Iron or an equivalent base and an oxide of an alkaline earth.
3. Iron or an equivalent base, an alkali metal oxide and a refractory oxide.
4. Iron or an equivalent base, an alkaline earth oxide and a refractory oxide.

In place of the iron outlined in the foregoing examples iron oxide may be used or only partly reduced mixtures of iron oxides or oxides of equivalent elements.

Examples of the alkali metals which are useful in these combinations are sodium, potassium, rubidium and cæsium; the alkaline earths are barium, strontium and calcium; examples of the refractory oxides are aluminum oxide, the oxides of silicon, thorium and zirconium.

The ingredients may be thoroughly mixed in any convenient manner, the preferred method being to fuse the mass in an electrical resistance furnace, after which the mixture is ground or powdered. If preferred the ingredients may be fused, ground, and mounted in a container or coated on a filament and reduced in place in the presence of a suitable gas and heat.

If the material is heated to about 500° C. in the presence of nitrogen, hydrogen, oxygen, or hydrogen-nitrogen mixtures, the magnitude of the positive ion current is changed from that which would be observed in a vacuum at the same temperature; thus, heating in the presence of hydrogen increases the flow of positive ions, while heating in the presence of oxygen decreases the flow of positive ions. The elevated temperature only serves to hasten the action but is not otherwise essential.

As an example of the materials for a mixture, it is found that a definite source of positively charged potassium ions is obtained from a mixture containing largely iron oxides, either partly or wholly reduced, in which a small amount, about 1%, of potassium, probably in the form of the oxide, exists which has been added before fusion in the form of potassium nitrate. To this mixture about 1% of aluminum oxide may be added, depending on the positive potassium ion emission desired at a given temperature.

One of these mixtures, made the hot anode of a discharge device, a positive ion current up to 1/10,000 of an ampere per square centimeter of hot surface was found to leave the surface in a vacuum. The magnitude of this positive ion current depends upon the ingredients in the mixture, temperature of the mixture; and the previous gas treatment.

From the foregoing it is apparent that, by properly controlling the above factors a desired positive ion current can be obtained.

While the exact mechanism involved in the evaporation of positively charged ions from the surface may not be thoroughly understood, it may in general, be similar to the following:

Considering a mixture of iron and potassium oxides the partly reduced iron in the mixture at a given temperature reduces some of the potassium oxide. This reduced potassium diffuses to the surface of the mixture where it evaporates in the form of positive potassium ions. The reason potassium escapes bearing a positive charge instead of neutral potassium vapor, is due to the fact that the electron affinity (O. W. Richardson's Work Function) is greater for the surface than the electron affinity between the potassium atom and its outer electron in the mixture. That the work function for the positive potassium ions is less than the work function of the surface as determined by the electron emission has been proven by experiment.

X-ray analysis of these mixtures shows conclusively that the oxides of potassium and aluminum must be very thoroughly and uniformly distributed throughout the mixture; since X-ray analysis on mixtures containing as much as 10% of aluminum and potassium oxides give no X-ray lines characteristic of aluminum oxide, or potassium oxide.

Two methods of mounting the mixture have been found satisfactory. The first consists in mounting the granules of the mixture in a platinum container and heating this container by radiation from a hot filament, preferably tungsten, this causes the granules to be heated by conduction from the platinum container.

In the second method the granules are coated on a platinum strip. In this instance the strip is heated by passing a current therethrough.

While the use of these mixtures is not limited to the specific thermionic devices, yet the drawing for thermionic tubes in which it may be used is submitted herewith by way of illustration.

In this drawing:

Fig. 1 is a longitudinal sectional view of a thermionic tube with the subject matter of this invention incorporated therein;

Fig. 2 is a similar view showing another method of utilizing the material.

Referring to the drawings by numerals of reference:

A tube 1 evacuated to a very low pressure has mounted therein a filament 2, conveniently a twisted platinum strip, coated with the mixture as indicated at 3. The filament may be connected through the leads 4 and 5 to a suitable source of electrical supply which tends to heat the same. Collectors 6, 7 and 8 are maintained at a potential negative to the filament through means of the leads 9 and 10 which are connected to suitable electrical source for that purpose. A filament 11 preferably of tungsten may be provided for the purpose of degassing the collectors though such provision is not essential to the operation of the device. The collector 6 is separated from the end collectors 7 and 8 so that positive ions from the part of the filament which is at uniform temperature can be separated from those of the remainder of the filament or the two ends, which are at somewhat lower temperatures.

In the modified form of mounting shown in Fig. 2 there is provided a tube 12 in which is mounted a cylinder 13, preferably of platinum in which is inclosed a filament 14 which may be heated in the well known manner by the connecting leads 15 and 16 to the source of electrical supply.

Surrounding the cylinder 13 and electrically connected thereto is a platinum basket 17 containing the material. A collector 19 is provided which is maintained at a potential negative to the potential of the basket 17 and material 18 being connected for that purpose to a suitable source of electrical supply through the lead 20. In this instance degassing filaments 21 and 22 may be utilized for the purpose of degassing the system though the same are not essential to its operation.

By using mixtures as hereinbefore outlined as the cathode of a discharge apparatus a definite and constant source of electrons is obtained for a particular mixture at a given temperature. It is therefore true that these materials give an appreciable thermionic electron emission when used as a cathode, as well as giving a constant and definite source of positive ions from the alkaline earths or alkali metals from 350° to 1100° C. when used as a hot anode. The temperatures stated are given as examples and are not limits for the temperature range.

It is further true that these substances when heated without the application of an electric field give off positive ions. In this instance the ions are not projected to a distant point but escape only a very short distance from the surface of the substance and again return to the substance thereby keeping the surface in a constant state of eruption. This is found to be highly desirable in catalytic action since the eruption of the surface thus set up, tends to keep the surface in a high state of chemical or catalytic activity and free from surface poison effects; thus a more active and effective catalyst is produced.

When positive ions are used in vacuum tubes desirable results are obtained as a slight discharge of positive ions tends to reduce the electron space charge in an electron discharge device. Furthermore, the positive ions of alkali metals given off will take care of certain gases formed in the tube, for example the discharged alkali metal atoms will unite with the oxygen formed in the tube and thereby reduce the oxygen content of the tube.

Many ways of applying this invention to use in vacuum tubes will naturally occur to those skilled in the art; as, for instance, the substance may be coated on or incorporated in the filament; or a separate filament adjacent to the usual filament may be used and heated from a separate source of current supply, or through a shunt from the main filament circuit; or a filament of the material, or coated with the material or a container filled with the material may be so associated with the main filament as to be heated by conduction or radiation therefrom.

What is claimed is:

1. An ion emitting composition comprising a substance capable of promoting the escape of positive ions, a positive ion emitting substance, and a substance which affects the quantity of such ions escaping.

2. An ion emitting composition comprising a substance capable of promoting the escape of positive ions, and a positive ion emitting substance.

3. An ion emitting composition comprising a substance capable of promoting the escape of positive ions, and a positive ion emitting oxide.

4. An ion emitting composition comprising a substance capable of promoting the escape of positive ions, a positive ion emitting oxide, and an oxide capable of affecting the quantity of such ions escaping.

5. An ion emitting composition comprising an oxide capable of promoting the escape of positive ions, a positive ion emitting substance, and a substance which affects the quantity of such ions escaping.

6. An ion emitting composition comprising an oxide capable of promoting the escape of positive ions and a positive ion emitting substance.

7. An ion emitting composition comprising an oxide capable of promoting the escape of positive ions and a positive ion emitting oxide.

8. An ion emitting composition comprising an oxide capable of promoting the escape of positive ions, a positive ion emitting oxide, and an oxide capable of affecting the quantity of such ions escaping.

9. The method of forming a positive ion emitting composition comprising mixing a positive ion emitting substance and a substance capable of promoting the escape of such ions and then fusing the mixture.

10. The method of forming a positive ion emitting composition, comprising mixing a positive ion emitting substance and a substance capable of promoting the escape of such ions, fusing the mixture, grinding the mixture and then reducing in the presence of heat and a gas having an effect upon the rate of discharge of positive ions.

11. The method of forming a positive ion emitting composition, comprising mixing a positive ion emitting substance and a substance capable of promoting the escape of such ions, fusing the mixture, grinding the fused mixture and applying the mixture to the element with which it is to be used and then reducing in the presence of heat.

12. The method of forming a positive ion emitting composition, comprising mixing a positive ion emitting substance and a substance capable of promoting the escape of such ions, fusing the mixture, grinding the fused mixture, reducing, and then applying to the element with which it is to be used.

CHARLES H. KUNSMAN.